(12) United States Patent
Hermann

(10) Patent No.: US 7,705,710 B2
(45) Date of Patent: Apr. 27, 2010

(54) METHOD FOR A START AND ACCESS SYSTEM FOR A MOTOR VEHICLE

(75) Inventor: Stefan Hermann, Köfering (DE)

(73) Assignee: Continental Automotive GmbH, Hannover (DE)

( * ) Notice: Subject to any disclaimer, the term of this patent is extended or adjusted under 35 U.S.C. 154(b) by 1070 days.

(21) Appl. No.: 11/277,303

(22) Filed: Mar. 23, 2006

(65) Prior Publication Data

US 2006/0214768 A1   Sep. 28, 2006

(30) Foreign Application Priority Data

Mar. 24, 2005   (DE) .................... 10 2005 013 910

(51) Int. Cl.
*B60R 25/00* (2006.01)
(52) U.S. Cl. ............ 340/5.72; 340/426.11; 340/426.13; 340/426.36; 701/2; 701/36
(58) Field of Classification Search .................. 340/5.72
See application file for complete search history.

(56) References Cited

U.S. PATENT DOCUMENTS

| | | | |
|---|---|---|---|
| 5,940,003 A | 8/1999 | Schulz | 340/825.31 |
| 6,218,932 B1 | 4/2001 | Stippler | 340/426 |
| 6,937,136 B2 * | 8/2005 | Greenwood et al. | 340/5.61 |
| 6,965,296 B2 | 11/2005 | Kamlah | 340/5.72 |

FOREIGN PATENT DOCUMENTS

| | | |
|---|---|---|
| DE | 198 36 957 C1 | 8/1998 |
| DE | 197 12 911 A1 | 10/1998 |
| DE | 198 12 294 C2 | 9/1999 |
| DE | 100 45 776 A1 | 4/2002 |
| DE | 100 46 897 B4 | 10/2002 |
| EP | 1 403 653 A1 | 9/2003 |
| GB | 2 371 137 A | 7/2002 |
| WO | 98/50652 | 3/1998 |

\* cited by examiner

*Primary Examiner*—Brian A Zimmerman
*Assistant Examiner*—Sara Samson
(74) *Attorney, Agent, or Firm*—King & Spalding L.L.P.

(57) ABSTRACT

A method for start and access verification of a motor vehicle by means of a mobile identification transmitter (3) with an evaluation unit arranged in the identification transmitter (3). At least two antennas (1, 2) arranged in different places on the vehicle in any order: each emit time independently an electromagnetic signal which is measured by a measuring device in the identification transmitter (3), and each simultaneously emit an electromagnetic signal which is measured by the measuring device in the identification transmitter (3). Thus, the security of start and access systems of motor vehicles is increased.

12 Claims, 3 Drawing Sheets

METHOD FOR A START AND ACCESS SYSTEM FOR A MOTOR VEHICLE

PRIORITY

This application claims priority from German Patent Application No. 10 2005 013 910.8, which was filed on Mar. 24, 2005, and is incorporated herein by reference in its entirety.

TECHNICAL FIELD

The invention relates to a method for start and access verification of a motor vehicle using a mobile identification transmitter with an evaluation unit arranged in the identification transmitter.

BACKGROUND

Access and start systems of motor vehicles operate on the principle of an identification transmitter being verified by a vehicle-side transmitting and receiving device, which comprises an evaluation unit, in the motor vehicle. This verification is undertaken by the exchange of radio signals which typically lie in the low frequency range. The radio transmission is activated as soon as a vehicle user operates a vehicle door. In this case a code signal of the identification transmitter is compared in the evaluation electronics of the vehicle with known code signals. If there is a positive match between the signals the motor vehicle is opened or started. Because it is transmitted by radio, the signal can be measured, disrupted or used in other ways by third parties. This can lead to unauthorized use of the vehicle.

An anti-theft device for a motor vehicle is known from DE 198 36 957 C1 in which a transceiver unit emits two consecutive request signals and these outputs are measured in a code generator The two measured signals are sent back by the code generator to the transceiver unit and compared there. A security device controls access to the motor vehicle accordingly, based on the signal comparison.

An access authorization system for a motor vehicle is known from DE 198 12 294 C2. For this system two antennas are arranged on the long side of the vehicle, one on the driver's side in the wing mirror and another in the area of the rear side window, in order to be able to cover the largest possible area around the motor vehicle for transmitting and receiving.

A method for determining the position of an object and for controlling access to a motor vehicle is known from DE 100 45 776 A1. In this method the position of an object in relation to a motor vehicle is determined on the one hand by signal delay times and on the other hand by determining a direction from which the signals are received. A predetermined roaming area of an object is defined in this case as the authorization access to a motor vehicle.

A method for verifying an identification transmitter is known from DE 100 46 897 B4. With this method both the transmit field strength and also the transmit direction are detected by at least one vehicle-side signal transmitter, depending on its position relative to the signal generator. The evaluation of the measured signals described demands measurement accuracy which in practice can only be implemented with difficulty.

An anti-theft system is known from WO 98/50652 A1 in which a request signal is emitted from a vehicle-side transmitter unit via two separate antennas.

This means that the request signal is transmitted in at least two different transmission channels, depending on the transmission parameters. The transmission parameters are varied depending on the response signal.

A magnetic sensor for an anti-theft system is known from DE 197 12 911 A1. In this case the angle of incidence of electromagnetic radiation emitted by a transmitter in the near field is detected. The magnetic field sensor consists of two conductor loops essentially arranged concentrically to each other.

Furthermore access authorization systems for motor vehicles are also known from EP 1 403 653 A1 and GB 2 371 137 A.

The disadvantage of the prior art is that the anti-theft devices described are susceptible to manipulation by third parties. The method known from DE 100 46 897 B4 also demands levels of measurement accuracy which are too high.

SUMMARY

The object of the present invention is thus to set out an improved method, compared to the prior art, for start and access systems, especially for motor vehicles, with increased security against possible manipulations by third parties.

In accordance with the invention this object can be achieved by a method for start and access verification of a motor vehicle by means of a mobile identification transmitter with an evaluation unit arranged in the identification transmitter, the method comprising the following steps executed in any order: at least two antennas arranged in different places on the vehicle each emit a first electromagnetic signal time independently from each other, which is measured by a measuring device in the identification transmitter; and the at least two vehicle-side antennas simultaneously emit a second electromagnetic signal which is measured by the measuring device in the identification transmitter.

The measuring device can measure the field strengths of the emitted electromagnetic signals of the first antenna and of the second antenna as components, respectively, with the components being arranged at right angles to each other. The measured field strengths of the first antenna and of the second antenna can be transferred by the identification transmitter to a vehicle-side evaluation unit. The measured components of the first antenna can be written as a first vector, the measured components of the second antenna as a second vector and the measured components the two antennas as a sum vector. The vector sum of the first and second vectors can be compared with the sum vector with respect to an amount and an angle dependency.

Thus, a method for verification of a mobile identification transmitter with an evaluation unit arranged in the identification transmitter is provided, wherein in any order: at least two vehicle-side antennas arranged in different places on the vehicle each transmit, time independently from each other, an electromagnetic signal which is measured by a measuring device in the identification transmitter; and the two vehicle-side antennas simultaneously emit an electromagnetic signal which is measured by the measuring device in the identification transmitter.

In a preferred embodiment of the invention the measuring device measures the field strengths of the electromagnetic signals of the antennas transmitted in each case as components x, y, z, with the components x, y, z being arranged at right angles to each other. This allows a more detailed evaluation of the measurements.

Alternatively or cumulatively the measured field strengths of the antennas are transferred by the identification transmitter to a vehicle-side evaluation unit. This means that an external evaluation unit is not necessary.

In a preferred embodiment of the invention the measured components x, y, z of a first antenna are written as vector V1, the measured components x, y, z of a second antenna as vector V2 and the measured components x, y, z of the two antennas as sum vector V12. In this way the measured components can be combined into a comparable variable in each case.

In a further preferred embodiment of the invention the calculated vector sums of the vectors V1, V2 are compared with the measured sum vector V12 as regards amount and angle dependency. This enables a decision to be made as to whether access to the motor vehicle will be granted or not.

This invention is particularly suitable for increasing the security of start and access systems of motor vehicles.

Further details and advantages of the invention are explained with reference to preferred exemplary embodiments as well as with reference to the drawing.

DETAILED DESCRIPTION

In the description of the preferred embodiments below the same reference symbols refer to the same or comparable components.

Figure 1:
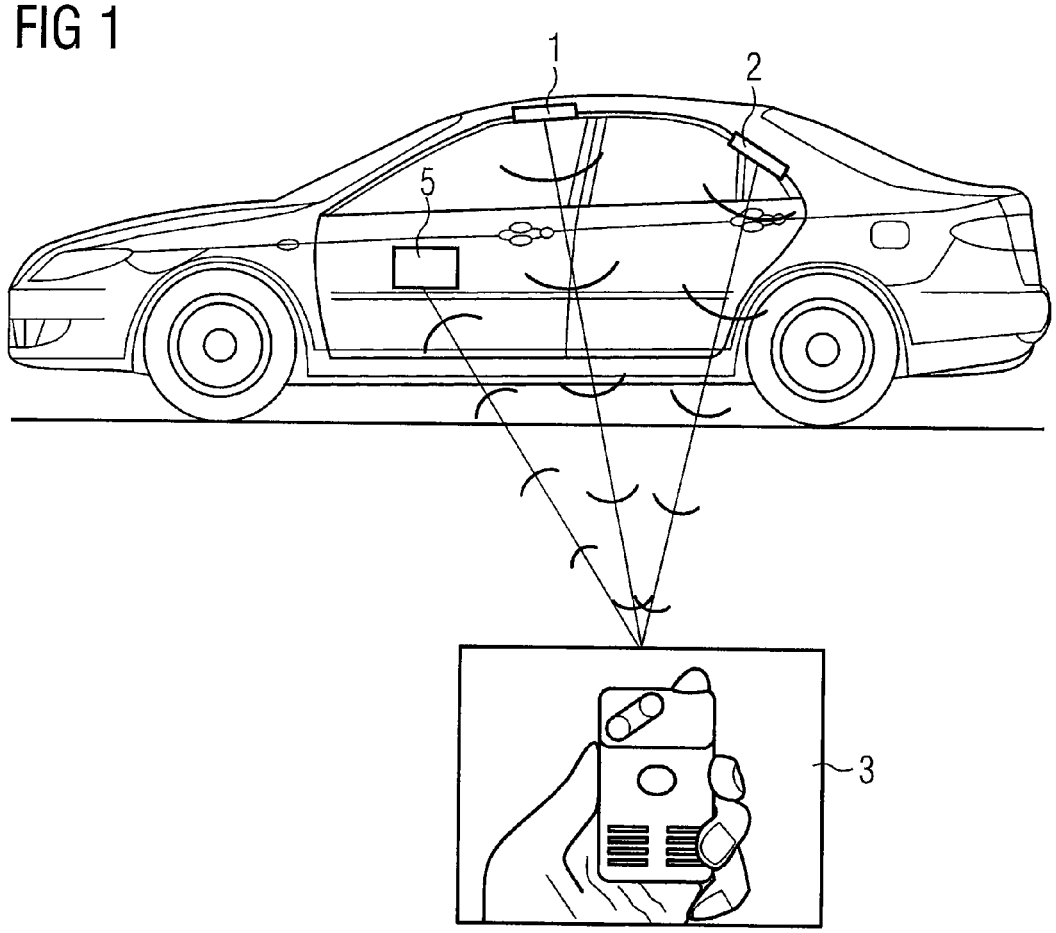
FIG. 1 a diagram of a motor vehicle with two vehicle-side antennas with an identification transmitter.

FIG. 1 shows a schematic diagram of a motor vehicle with two vehicle-side antennas 1, 2 for verifying a mobile Identification transmitter 3 with an evaluation unit arranged in the identification sender 3.

The antennas 1, 2 send out a signal as soon as a corresponding door handle of a vehicle door which is closest to the antennas 1, 2 is operated.

The vehicle-side antennas 1, 2 send out electromagnetic signals which are measured by a measuring device in the identification transmitter 3.

A corresponding evaluation unit can be arranged both in the identification transmitter 3 and also in the motor vehicle. In the latter case the signals, after being measured by the identification transmitter 3, are transferred to a vehicle-side evaluation unit 5.

By continuously sending signals of the antennas 1, 2 it is possible also to verify the identification transmitter automatically as the user is approaching the motor vehicle.

Figure 2:
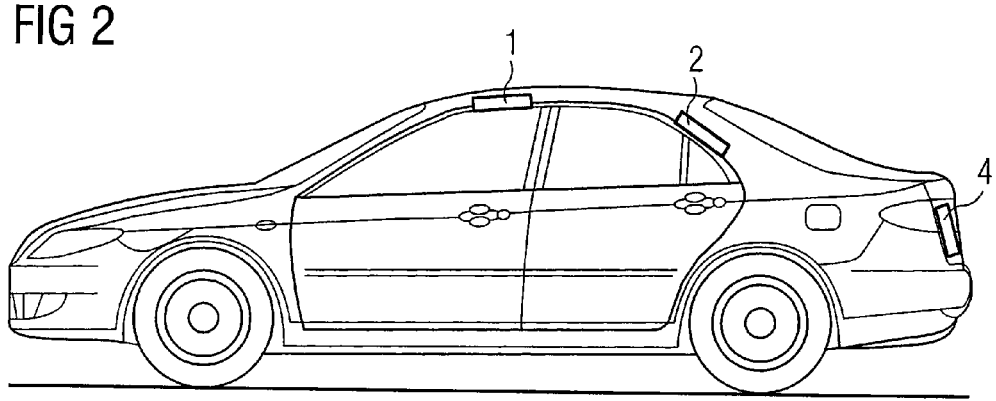
FIG. 2 a diagram of a side view of a motor vehicle with a number of antennas arranged on it.

FIG. 2 shows a schematic diagram of a side view of a motor vehicle with a number of antennas 1, 2 and 4 arranged on it.

Figure 3:
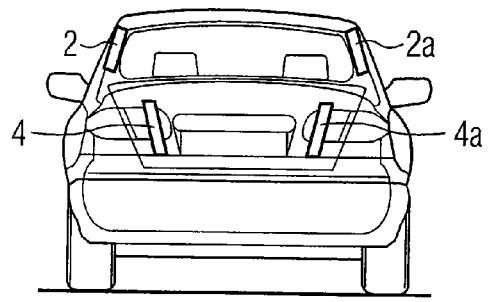
FIG. 3 a rear view of a motor vehicle with a number of antennas arranged on it.

FIG. 3 shows a schematic rear view of a motor vehicle similar to that shown in FIG. 2 with a number of antennas 2, 2a, 4 and 4a arranged on the vehicle. In this case the antennas 2 and 2a operate both in the vicinity of the vehicle and also in the vehicle interior. The antennas 4 and 4a operate in the vicinity of the vehicle and in the trunk. This arrangement of the antennas allows the number of antennas to be minimized.

Figure 4:
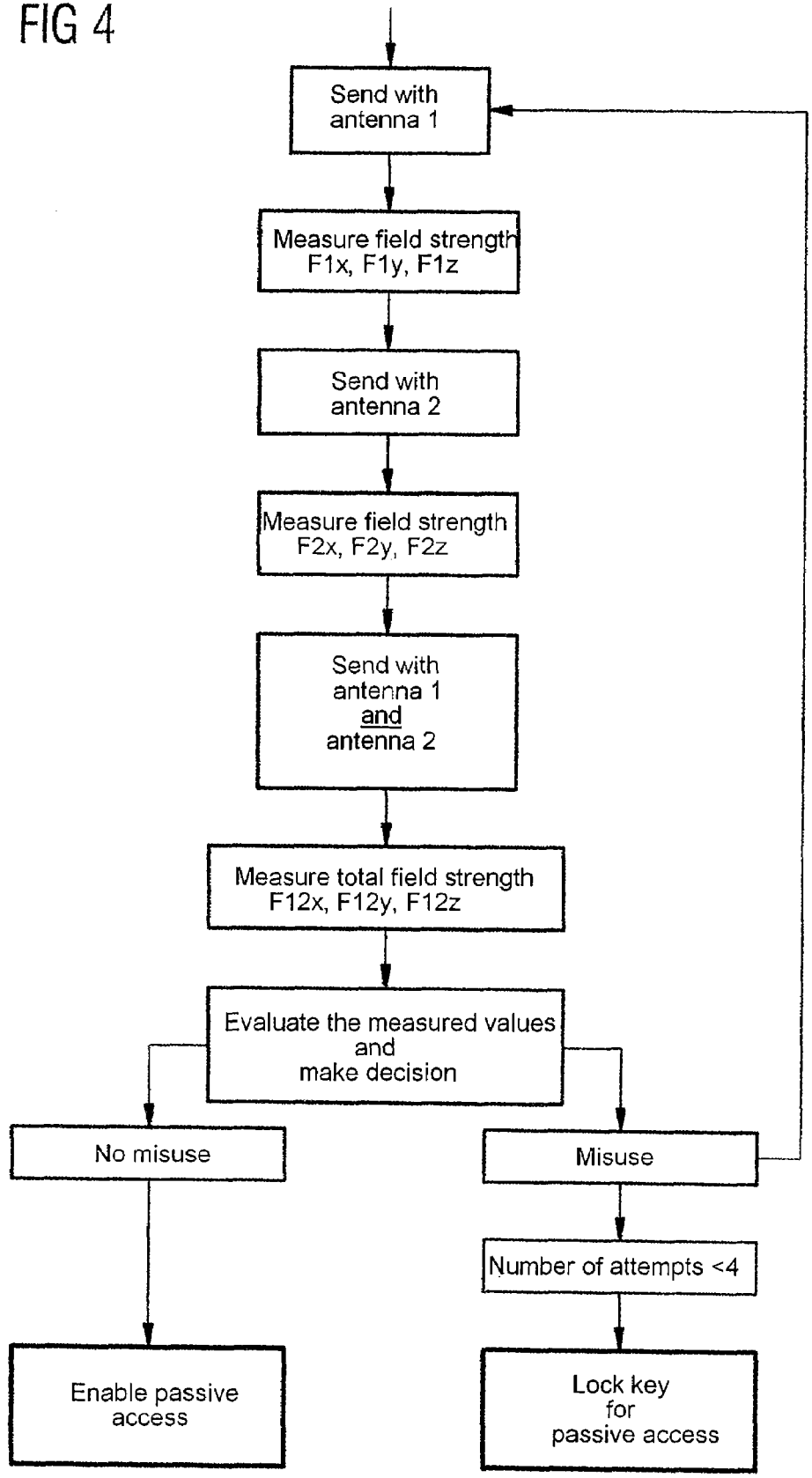
FIG. 4 a flowchart of signal measurement and evaluation.

FIG. 4 shows a schematic flowchart of a signal measurement and evaluation. The sequence begins with antenna 1 sending a signal. The components of the field strengths in the x, y, and z direction are measured accordingly by the identification transmitter 3 (cf. FIG. 1); labeled here as F1$x$, F1$y$, F1$z$. In a similar way the signals of antenna 2 are sent and measured by identification transmitter 3 (cf. FIG. 1). Finally the sum signal is sent by antenna 1 and 2 and measured by identification transmitter 3 (cf. FIG. 1). The measured field strengths or their amounts are now transferred to the vehicle-side evaluation unit 5. An evaluation of the (field strength) measurements is then undertaken by the evaluation unit within the vehicle and a decision is made whether to enable access to the motor vehicle or not. In this case for example the amount of the field strengths of antenna 1 and 2 in total is compared with the amount of the total field strength of the common signal of antenna 1 and 2. If the two amounts match access to the motor vehicle is enabled, otherwise the motor vehicle remains locked. The verification can be configured so that after a given number of attempts, for which the number can be varied, the vehicle remains locked.

What we claim is:

1. A method for start and access verification of a motor vehicle by means of a mobile identification transmitter with an evaluation unit arranged in the identification transmitter, the method comprising the following steps executed in any order:
    at least two antennas arranged in different places on the vehicle each emit a first electromagnetic signal time independently from each other, which is measured by a measuring device in the identification transmitter;
    the at least two vehicle-side antennas simultaneously emit a second electromagnetic signal which is measured by the measuring device in the identification transmitter;
    the measuring device measures the field strengths of the first and second electromagnetic signals as components;
    the measured components of the first electromagnetic signal emitted by the first antenna are written as a first vector, the measured components of the first electromagnetic signal emitted by the second antenna are written as a second vector, and the measured components of the second electromagnetic signal emitted by both the first and second antennas are written as a sum vector;
    comparing the vector sum of the first and second vectors with the sum vector; and
    determining whether to provide access to the motor vehicle based on the results of the comparison.

2. A method according to claim 1, wherein the field strength components of the emitted electromagnetic signals of the first antenna and of the second antenna are arranged at right angles to each other.

3. A method according to claim 1, wherein the vector sum of the first and second vectors are compared with the sum vector with respect to an amount and an angle dependency.

4. A method according to claim 1, wherein providing access to the motor vehicle comprises unlocking the motor vehicle.

5. A method according to claim 1, wherein providing access to the motor vehicle comprises starting the motor vehicle.

6. A method for start and access verification of a motor vehicle by means of a mobile identification transmitter with an evaluation unit arranged in the identification transmitter, the method comprising the steps of;
    at least two antennas arranged in different places on the vehicle each emit a first electromagnetic signal time independently from each other, which is measured by a measuring device in the identification transmitter;
    the at least two vehicle-side antennas simultaneously emit a second electromagnetic signal which is measured by the measuring device in the identification transmitter;

the measuring device measures the field strengths of the emitted electromagnetic signals of the first antenna and of the second antenna as components in each case, with the components being arranged at right angles to each other;

the measured field strengths of the first antenna and of the second antenna are transferred by the identification transmitter to a vehicle-side evaluation unit;

the measured components of the first electromagnetic signal emitted by the first antenna are written as a first vector, the measured components of the first electromagnetic signal emitted by the second antenna are written as a second vector, and the measured components of the second electromagnetic signal emitted by both the first and second antennas are written as a sum vector;

a vector sum of the first vector and the second vector is calculated; and the vector sum first vector and the second vector is compared with the sum vector of the second electromagnetic signal emitted by both the first and second.

7. A method according to claim 6, wherein the steps of emitting the first and second electromagnetic signals are executed in any order.

8. A method for start and access verification of a motor vehicle by means of a mobile identification transmitter with an evaluation unit arranged in the identification transmitter, the method comprising steps:

emitting first electromagnetic signals by each of at least two antennas arranged in different places on the vehicle in a time independent fashion;

measuring the first electromagnetic signals by a measuring device in the identification transmitter;

emitting simultaneously second electromagnetic signals by the at least two vehicle-side antennas; measuring the second electromagnetic signals by the measuring device in the identification transmitters;

measuring the field strengths of the emitted electromagnetic signals of the first antenna and of the second antenna as components, respectively, with the components being arranged at right angles to each other;

writing the measured components of the first electromagnetic signal emitted by the first antenna as a first vector, the measured components of the first electromagnetic signal emitted by the second antenna as a second vector, and the measured components of the second electromagnetic signal emitted by both the first and second antennas as a sum vector;

comparing the vector sum of the first and second vectors with the sum vector with respect to an amount and an angle dependency; and determining whether to provide access to the motor vehicle based on the results of the comparison.

9. A method according to claim 8, wherein the steps of emitting the first and second electromagnetic signals are executed in any order.

10. A method according to claim 8, wherein the measured field strengths of the first antenna and of the second antenna are transferred by the identification transmitter to a vehicle-side evaluation unit for the comparison of the vector sum of the first and second vectors with the sum vector.

11. A method according to claim 8, wherein providing access to the motor vehicle comprises unlocking the motor vehicle.

12. A method according to claim 8, wherein providing access to the motor vehicle comprises starting the motor vehicle.

* * * * *